(12) United States Patent
Sharifipour et al.

(10) Patent No.: US 10,389,134 B2
(45) Date of Patent: Aug. 20, 2019

(54) ELECTRICAL POWER DISTRIBUTION SYSTEM AND METHOD

(71) Applicant: Katerra, Inc., Menlo Park, CA (US)

(72) Inventors: Bahman Sharifipour, Newington, NH (US); Mark Thomas, Cupertino, CA (US); Ravi Naik, San Jose, CA (US)

(73) Assignee: Katerra, Inc., Menlo Park, CA (US)

( * ) Notice: Subject to any disclaimer, the term of this patent is extended or adjusted under 35 U.S.C. 154(b) by 0 days.

(21) Appl. No.: 15/724,206

(22) Filed: Oct. 3, 2017

(65) Prior Publication Data

US 2018/0375339 A1 Dec. 27, 2018

Related U.S. Application Data

(60) Provisional application No. 62/523,194, filed on Jun. 21, 2017, provisional application No. 62/532,945, filed on Jul. 14, 2017.

(51) Int. Cl.
*H02J 3/38* (2006.01)
*H02J 3/46* (2006.01)

(52) U.S. Cl.
CPC ............... *H02J 3/383* (2013.01); *H02J 3/46* (2013.01)

(58) Field of Classification Search
CPC .................................................. H02J 3/38–50
See application file for complete search history.

(56) References Cited

U.S. PATENT DOCUMENTS 6,134,124 A 10/2000 Jungreis et al.
6,369,461 B1 4/2002 Jungreis et al.
6,512,966 B2 1/2003 Lof et al.
(Continued)

FOREIGN PATENT DOCUMENTS

WO 2010042118 A1 4/2010

OTHER PUBLICATIONS

Youngjin Kim, "Modeling and Analysis of a DC Electrical System and Controllers for Implementation of a Grid Interactive Building"; 2017; p. 1; pp. 3-4; p. 8; p. 11; p. 12; p. 14; figure; US.
(Continued)

*Primary Examiner* — Rexford N Barnie
*Assistant Examiner* — David A Shiao
(74) *Attorney, Agent, or Firm* — Elliott, Ostrander & Preston, P.C.

(57) ABSTRACT

An electrical power distribution system includes an electrical power router with input ports and output ports and distributes an electrical signal received on one of the input ports to one of output ports. An electrical input adapter coupled to one of the input ports and further to couple to an electrical power source receives and convert an electrical signal input from the electrical power source to the electrical signal distributed by the power router. An electrical output adapter coupled to one of the output ports and further to couple to an electrical power load receives and converts the electrical signal distributed by the power router from the one of the output ports to an electrical signal output to the electrical power load. A controller coupled to the electrical input adapter, the electrical output adapter, and the electrical power router, controls transmission of the electrical signal from the electrical input adapter to the electrical output adapter through the electrical power router.

7 Claims, 1 Drawing Sheet

(56) References Cited

U.S. PATENT DOCUMENTS

| | | | |
|---|---|---|---|
| 7,162,878 | B2 | 1/2007 | Narayanamurthy et al. |
| 7,224,131 | B2 | 5/2007 | Wilhelm |
| 7,274,975 | B2 | 9/2007 | Miller |
| 7,701,083 | B2 | 4/2010 | Savage |
| 8,008,808 | B2 | 8/2011 | Seeker et al. |
| 8,164,217 | B1 | 4/2012 | Miller |
| 8,401,709 | B2 | 3/2013 | Cherian et al. |
| 8,421,270 | B1 | 4/2013 | Miller et al. |
| 8,442,698 | B2 | 5/2013 | Fahimi et al. |
| 8,447,435 | B1 | 5/2013 | Miller et al. |
| 8,532,808 | B2 | 9/2013 | Drees et al. |
| 8,615,381 | B2 | 12/2013 | Brown |
| 8,649,914 | B2 | 2/2014 | Miller et al. |
| 8,781,640 | B1 | 7/2014 | Miller |
| 8,958,218 | B2 | 2/2015 | Reichard et al. |
| 9,024,594 | B2 | 5/2015 | Reichard et al. |
| 9,035,492 | B1 | 5/2015 | Miller |
| 9,093,862 | B2 | 7/2015 | Dennis et al. |
| 9,312,698 | B2 | 4/2016 | Subbotin et al. |
| 9,368,967 | B1 | 6/2016 | Vedder |
| 9,373,965 | B2 | 6/2016 | Liu et al. |
| 9,438,041 | B2 | 9/2016 | Roy et al. |
| 9,459,643 | B2 | 10/2016 | Miller et al. |
| 9,563,224 | B2 | 2/2017 | Saussele |
| 9,568,903 | B2 | 2/2017 | Miller |
| 9,570,753 | B2 | 2/2017 | Dennis et al. |
| 9,685,852 | B2 | 6/2017 | Somani et al. |
| 9,692,236 | B2 | 6/2017 | Wootton et al. |
| 9,937,810 | B2 * | 4/2018 | Saussele ............. B60L 11/1842 |
| 2011/0095606 | A1 | 4/2011 | Ou |
| 2011/0140524 | A1 | 6/2011 | Realmuto et al. |
| 2012/0083930 | A1 | 4/2012 | Ilic et al. |
| 2012/0267952 | A1 * | 10/2012 | Ballatine ................ H02J 1/102 307/26 |
| 2012/0319477 | A1 | 12/2012 | Brownlee |
| 2013/0300196 | A1 | 11/2013 | Clark et al. |
| 2014/0049105 | A1 | 2/2014 | Ragavanis |
| 2014/0172182 | A1 | 6/2014 | Subbotin et al. |
| 2014/0183949 | A1 * | 7/2014 | Murano ................... G05F 1/67 307/24 |
| 2014/0200723 | A1 | 7/2014 | Roy et al. |
| 2015/0207316 | A1 | 7/2015 | Saussele et al. |
| 2015/0253789 | A1 | 9/2015 | Saussele et al. |
| 2015/0318705 | A1 * | 11/2015 | Lucas ..................... H02J 3/381 307/129 |
| 2016/0042377 | A1 | 2/2016 | Ilic et al. |
| 2016/0111971 | A1 | 4/2016 | Rayner et al. |
| 2016/0334822 | A1 * | 11/2016 | Kobayashi ......... H02J 13/0062 |
| 2017/0005473 | A1 | 1/2017 | Somani et al. |
| 2017/0093156 | A1 | 3/2017 | Ozbek et al. |
| 2017/0179723 | A1 * | 6/2017 | Chen ..................... H02J 3/382 |
| 2017/0194791 | A1 * | 7/2017 | Budde .................... H02J 3/383 |
| 2017/0358929 | A1 * | 12/2017 | Koeppe .................... H02J 3/46 |

OTHER PUBLICATIONS

Dinesh Kumar, Firuz Zare, Arindam Ghosh; "DC Microgrid Technology System Architectures, AC Grid Interfaces, Grounding Schemes, Power Quality, Communication Networks, Applications and Standardizations Aspects"; 2017; pp. 1-3; figure 13; vol. 5; IEEE; US.

"Totally Integrated Power: Planning of Electrical Power Distribution, Technical Principles"; Siemans AG 2016; Article No. EMMS-T10007-00-7600; Germany.

"Power Distribution Systems"; EATON, Apr. 2016; CA008104001E.

* cited by examiner

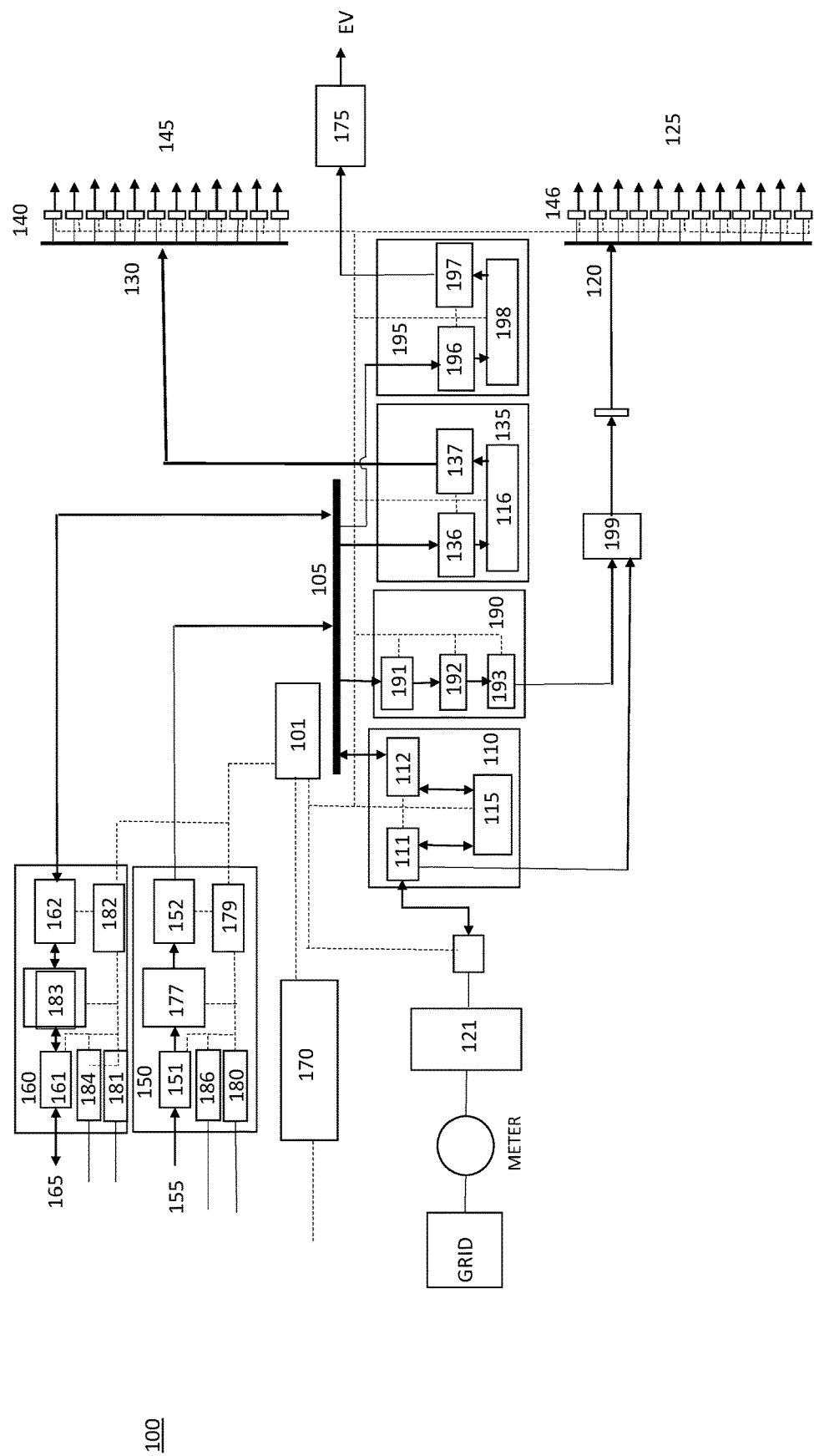

ELECTRICAL POWER DISTRIBUTION SYSTEM AND METHOD

CROSS-REFERENCE TO RELATED APPLICATIONS

This application claims the benefit of U.S. Provisional Application No. 62/523,194, filed Jun. 21, 2017, and U.S. Provisional Application No. 62/532,945, filed Jul. 14, 2017, the entire contents of which are hereby incorporated by reference herein.

TECHNICAL FIELD

Embodiments of the present invention relate to electrical power distribution systems and methods. In particular, embodiments of the invention monitor and control electrical current in an electrical power distribution system to route power from a plurality of electrical power sources to a plurality of electrical power loads.

BACKGROUND

Today, a building site does not need to obtain all electrical power from the public utility grid, or simply, "grid". There are alternative energy sources (AES) to the grid, for example photovoltaic (PV) solar, wind, geothermal, etc., that may be available. In most cases, an AES is in close proximity to the building site. For example, in the case of the PV solar, the solar panel may be located adjacent to or on the roof of a building. In addition, the building site may have access to locally stored power, e.g., in the form of lithium ion batteries or fuel cells.

Prior art equipment configurations used to produce, convert, distribute, and store power for or to a building site are complex and expensive, with many pieces of equipment and many interfaces. What is needed is a simple, relatively inexpensive system to produce, convert, distribute and store electrical power for a building site.

BRIEF DESCRIPTION OF THE DRAWINGS

Embodiments are illustrated by way of example, and not by way of limitation, and can be more fully understood with reference to the following detailed description when considered in connection with FIG. 1 which illustrates an embodiment of the invention.

DETAILED DESCRIPTION

With reference to FIG. 1, an electrical power distribution system 100 comprises a central electrical power switch or router that receives DC electrical power from or to one or more electrical power sources and transmits the DC electrical power to one or more electrical power loads. In one embodiment, a DC bus 105 receives and transmits electrical power at a first fixed DC voltage level, for example, 800 volts, from one or more electrical power sources to one or more electrical power loads. The embodiment further includes a number of DC power output ports 130 to transmit electrical power at a second fixed DC voltage level to a corresponding number of DC power loads 145. For example, in one embodiment, the second fixed DC voltage level is 60 volts. In one embodiment, each output port 130 connects the electrical power distribution system to an individual unit in a building site, for example, a single family dwelling. There may also be other output ports connected to an electrical load in common or shared among the individual units, such as building site lighting or a control panel for a fire alarm system.

A like number of current and voltage sensors 140 respectively monitor the current and voltage usage for each of the DC power output ports 130. These sensors and associated circuitry, among other things, detect an amount of DC transmitted by the DC power output ports 130 to the DC power loads 145. It is contemplated that the sensors 140 may be hierarchically arranged, wherein one sensor 140 communicates with the other sensors 140 and aggregates information or data about the current and/or voltage usage of the DC power loads and communicates on behalf of all the sensors 140 with a controller such as controller 101 described herein below. Alternatively, each sensor 140 may communicate individually with controller 101.

In one embodiment, a DC power output adapter 135 couples the DC bus 105 to the DC power output ports 130 to provide DC power to the DC power loads 145. The DC power output adapter comprises an input bus interface 136 that couples the DC power output adapter 135 to the DC bus, and an output interface 137 that couples the DC power output adapter to the DC power output ports 130. A DC-to-DC (DC/DC) converter 116 is coupled to the input bus interface 136 and the output interface 137 to receive and convert the electrical power transmitted on the DC bus at the first fixed DC voltage level to electrical power at the second fixed DC voltage level for transmission to the DC power output ports 130. In one embodiment, the DC/DC converter is a 10 kW DC/DC converter.

The embodiment further includes a number of alternating current (AC) power output ports 120 to transmit electrical power at a first fixed AC voltage level to a corresponding number of AC power loads 125. For example, in one embodiment, the first fixed AC voltage level is 240 volts AC (Vac). In one embodiment, each output port 120 connects the electrical power distribution system to an individual unit in the building site, for example, a single family dwelling. As in the case of output ports 130, there may be other output ports 120 connected to an electrical load in common or shared among the individual units.

A like number of current and voltage sensors 146 respectively monitor the current and voltage usage for each of the AC power output ports 120. These sensors and associated circuitry, similar to sensors 140, detect an amount of AC transmitted by the AC power output ports 120 to the AC power loads 125. It is contemplated that the sensors 146 may be hierarchically arranged, wherein one sensor 146 communicates with the other sensors 146 and aggregates information or data about the current and/or voltage usage of the AC power loads and communicates on behalf of all the sensors 146 with a controller such as controller 101. Alternatively, each sensor 146 may communicate individually with controller 101.

In one embodiment, an AC power input/output (I/O) adapter 110 couples the DC bus 105 to the AC power output ports 120 to provide AC power to the AC power loads 125. The AC power IO adapter comprises an input/output bus interface 112 that couples the AC power IO adapter 110 to the DC bus, and an input/output interface 111 that couples the AC power IO adapter to the AC power output ports 120. A bi-directional AC-to-DC converter 115 is coupled to the input/output bus interface 112 and the input/output interface 111 to receive and convert the electrical power transmitted on the DC bus at the first fixed DC voltage level to electrical power at the first fixed AC voltage level for transmission to the AC power output ports 120. In one embodiment, the bidirectional AC/DC converter is a 50 kW bidirectional AC/DC converter.

The AC power I/O adapter 110 further is to couple to an AC power grid 121 (e.g., a public utility grid) to receive and convert electrical power transmitted from the AC power grid 121 at a second fixed AC voltage level to the electrical power at the first fixed AC voltage level for transmission to the AC power output ports 120. In one embodiment, the second fixed AC voltage level is 277 volts AC (Vac). The AC power IO adapter 110 comprises an input/output interface 111 that couples the AC power IO adapter to the AC power grid (or AC distribution panel connected therewith). In one embodiment, the AC/DC bidirectional converter 115 is coupled to the input/output interface 111 to receive and convert electrical power transmitted from the AC power grid at the second fixed AC voltage level to the electrical power at the first fixed DC voltage level for transmission to the DC bus via input/output interface 112, and to receive and convert the electrical power transmitted on the DC bus at the first fixed DC voltage level to the electrical power at the second fixed AC voltage level for transmission to the AC power grid. In other words, the electrical power distribution system 100 can feed back electrical power from the system to the grid, as conditions warrant.

In one embodiment, the AC/DC bidirectional converter 115 is coupled to the input/output interface 111 to receive and convert electrical power transmitted from the AC power grid at the second fixed AC voltage level to the electrical power at the first fixed AC voltage level for transmission to the AC power output ports 120 via input/output interface 111.

In one embodiment, an AC power output adapter 190 couples the DC bus 105 and to the plurality of AC power output ports 120 to provide AC power to the AC power loads 125. The AC power output adapter comprises an input bus interface 191 that couples the AC power output adapter to the DC bus, and an output interface 193 that couples the AC power output adapter to the AC power output ports 120. A DC-to-AC (DC/AC) converter 192 is coupled to the input bus interface 191 and the output interface 193 to receive and convert the electrical power transmitted on the DC bus at the first fixed DC voltage level to the electrical power at the first fixed AC voltage level for transmission to the AC power output ports. In an alternative embodiment, the AC/DC bidirectional converter 115 in the AC I/O power adapter 110 could provide the same functionality as DC/AC converter 192, but it would not provide the redundancy and failsafe functionality of having this functionality provided by DC/AC converter 192 located in the separate adapter 190.

In one embodiment, an DC power output adapter 195 couples the DC bus 105 and to DC power output port 175 to provide DC power to a DC power load 175, such an electric vehicle charging station. The DC power output adapter comprises an input bus interface 196 that couples the DC power output adapter to the DC bus, and an output interface 197 that couples the DC power output adapter to the DC power output port 175. A DC-to-DC (DC/DC) converter 198 is coupled to the input bus interface 196 and the output interface 197 to receive and convert the electrical power transmitted on the DC bus at the first fixed DC voltage level to electrical power a fixed DC voltage level for transmission to the DC power output port 175.

In one embodiment, a controller 101 is coupled to the DC power output adapter 135, the current and voltage sensors 140 to control an amount of the electrical power transmitted on the DC bus 105 at the first fixed DC voltage level that the DC power output adapter 135 is to receive and convert to the electrical power at the second fixed DC voltage level for transmission to the DC power output ports 130, based on the amount of DC transmitted by the DC power output ports to the DC power loads as detected by the current and voltage sensors 140.

In one embodiment, controller 101 is coupled to the AC power I/O adapter 110, and the current and voltage sensors 146, to control an amount of the electrical power transmitted from the AC power grid at the second fixed AC voltage level that the AC power I/O adapter 110 is to receive and convert to the electrical power at the first fixed AC voltage level for transmission to the AC power output ports 120, based on the amount of AC transmitted by the AC power output ports 120 to the AC power loads 125 as detected by current and voltage sensors 146.

In one embodiment, controller 101 is coupled to the DC power output adapter 135, the current and voltage sensors 140, and the AC power I/O adapter 110, to control an amount of the electrical power transmitted from the AC power grid at the second fixed AC voltage that the AC power I/O adapter 110 is to receive and convert to the electrical power at the first fixed DC voltage level for transmission to the DC bus 105, based on the amount of DC transmitted by the DC power output ports 130 to the DC power loads 145 detected by current and voltage sensors 140.

In one embodiment, controller 101 is coupled to the AC power output adapter 190 and the current and sensors 146, to control an amount of the electrical power transmitted on the DC bus 105 at the first fixed DC voltage level that the AC power output adapter 190 is to receive and convert to the electrical power at the first fixed AC voltage level for transmission to the AC power output ports 120, based on the amount of AC transmitted by the AC power output ports to the AC power loads as detected by the current and sensors 146.

In one embodiment, controller 101 is to control the amount of the electrical power transmitted on the DC bus 105 at the first fixed DC voltage level that the AC power I/O adapter 110 is to receive and convert to the electrical power at the second fixed AC voltage level for transmission to the AC power grid, based on one or more of the amount of DC transmitted by the plurality of DC power output ports 130 to the plurality of DC power loads 145 as detected by the first circuitry, the amount of AC transmitted by the plurality of AC power output ports 120 to the plurality of AC power loads 125 as detected by the second circuitry, the state of the DC power source, and the state of the DC power storage device.

In one embodiment, the electrical power distribution system further comprises a DC power input adapter 150 coupled to the DC bus 105 and to couple to a DC power source 155 to provide DC power to the electrical power distribution system. In one embodiment, the DC power source is an alternative energy source, such as a PV solar power source. The DC power input adapter includes an input interface 151 that couples the DC power input adapter 150 to the DC power source 155, and an output bus interface 152 that couples the DC power input adapter to the DC bus 105. A DC-to-DC (DC/DC) converter 177 is coupled to the input interface 151 and the output bus interface 152 to receive and convert electrical power transmitted by the DC power source at a third fixed DC voltage level to the electrical power transmitted on the DC bus at first fixed DC voltage level. In one embodiment, the third fixed DC voltage level is 1000 volts. In one embodiment, the DC/DC converter is a 1000 volt to 800 volt DC/DC converter.

Controller 101 further is coupled to the DC power input adapter 150 to control an amount of the electrical power at the third fixed DC voltage level that the DC power input adapter 150 is to receive and convert to electrical power at the first fixed DC voltage level for transmission on the DC bus 105.

The controller, in one embodiment, controls the amount of the electrical power at the third fixed DC voltage level that the DC power input adapter 150 is to receive and convert to electrical power at the first fixed DC voltage level for transmission on the DC bus 105, based on one or more of the amount of DC transmitted by the DC power output ports 130 to the DC power loads 145 as detected by the current and voltage sensors 140, the amount of AC transmitted by the AC power output ports 120 to the AC power loads 125 as detected by the current and voltage sensors 146, and the desirability of or the priority assigned to the electrical power transmitted from the AC power grid 121 at the second fixed AC voltage level relative to the desirability of or priority assigned to the electrical power transmitted by the DC power source 155 at a third fixed DC voltage level. The desirability of or priority assigned to the electrical power transmitted from the AC power grid 121 at the second fixed AC voltage level relative to the desirability of or priority assigned to the electrical power transmitted by the DC power source 155 at a third fixed DC voltage level may be based on, for example, one or more of unit price, environmental impact, availability, quality, stability, capacity, transmission or delivery efficiency, location or distance of a source, etc.

In one embodiment, DC power input adapter 150 includes parameter sensor 180 to detect a state of the DC power source 155. In such case, the controller 101 may control the amount of the electrical power at the third fixed DC voltage level that the DC power input adapter 155 is to receive and convert to electrical power at the first fixed DC voltage level for transmission on the DC bus 105 based on the state of the DC power source, or environmental factors that impact the state of the DC power source, such as, in the case where the DC power source is a PV solar power source, the temperature, wind, intensity and/or angle of incidence of sunlight to the DC power source, time of day, season, etc. In one embodiment, DC power input adapter 150 further includes a controller 186 in communication with DC power source 155 by which DC power input adapter 150 can control functionality of the DC power source 155.

The electrical power distribution system, in one embodiment, comprises a DC power input/output (I/O) adapter 160 coupled to the DC bus 105 and further to couple to a DC power storage device 165. The DC power I/O adapter includes an input/output interface 161 that couples the DC power I/O adapter to DC power storage device 165, and an input/output bus interface 162 that couples the DC power IO adapter to the DC bus 105. A bi-directional DC/DC converter is coupled to the input/output interface 161 and the input/output bus interface 162 to receive and convert the electrical power transmitted on the DC bus 105 at the first fixed DC voltage level to an electrical power transmitted to the DC power storage device 165 at a fourth fixed DC voltage level, and to receive and convert the electrical power transmitted from the DC power storage device 165 at the fourth fixed DC voltage level to the electrical power transmitted on the DC bus 105 at the first fixed DC voltage level. In one embodiment, the fourth fixed DC voltage level is 400 volts. In one embodiment, the DC/DC converter is a 400 volt to 800 volt DC/DC converter. In one embodiment, the DC power storage device is a Lithium-ion battery, and may include a battery management system.

In one embodiment, the controller 101 further is coupled to the DC power I/O adapter 160 to control an amount of the electrical power transmitted on the DC bus 105 at the first fixed DC voltage level that the DC power I/O adapter is to receive and convert to electrical power at the fourth fixed DC voltage level for transmission to the DC power storage device 165. In one embodiment, the amount of the electrical power transmitted on the DC bus 105 at the first fixed DC voltage level that the DC power I/O adapter 160 is to receive and convert to electrical power at the fourth fixed DC voltage level for transmission to the DC power storage device 165 is based on one or more of the amount of DC transmitted by the DC power output ports 130 to the DC loads 145 as detected by the current sensors 140, the amount of AC transmitted by the AC power output ports 120 to the AC loads 125 as detected by the current sensors 146, and the amount of the electrical power transmitted by the DC power source 160 at the third fixed DC voltage level.

In another embodiment, the controller further is to control an amount of the electrical power at the fourth fixed DC voltage level that the DC power I/O adapter 160 is to receive and convert for transmission on the DC bus 105 at the first fixed DC voltage level. The controller may do so based on one or more of the amount of DC transmitted by the DC power output ports 130 to the DC loads 145 as detected by the current sensors 140, the amount of AC transmitted by the AC power output ports 120 to the AC loads 125 as detected by the current sensors 146, the amount of the electrical power transmitted by the DC power source 155 at the third fixed DC voltage level, the desirability of or priority assigned to the electrical power transmitted from the AC power grid 120 at the second fixed AC voltage level relative to the desirability of or priority assigned to the electrical power transmitted by the DC power I/O adapter 165 at the fourth fixed DC voltage level, and the desirability of or priority assigned to the electrical power transmitted from the DC power source 155 at the third fixed DC voltage level relative to the desirability of or priority assigned to the electrical power transmitted by the DC power I/O adapter 165 at the fourth fixed DC voltage level. In these embodiments, desirability of or priority assigned to a particular electrical power source may be based on, for example, one or more of unit price, environmental impact, availability, quality, stability, capacity, transmission or delivery efficiency, location or distance of a source, etc.

In one embodiment, DC power I/O adapter 160 includes parameter sensor 181 to detect a state of the DC power storage device 165. In such case, the controller 101 may control the amount of the electrical power at the fourth fixed DC voltage level that the DC power I/O adapter 155 is to receive and convert to electrical power at the first fixed DC voltage level for transmission on the DC bus 105 based on the state of the DC power storage device, or factors that impact the state of the DC power storage device. In one embodiment, DC power I/O adapter 160 further includes a controller 184 in communication with DC power storage device 165 by which DC power I/O adapter 160 can control functionality of the DC power storage device 165.

In one embodiment, controller 101 is a central controller located within the electrical power distribution system and communicates with a microcontroller or the like located in each component it controls, for example, microcontrollers 180 and 181 respectively located in adapters 150 and 160. In another embodiment, the controller may be a distributed controller system, wherein each component described herein as being in communication with the controller may in fact incorporate or communicate with its own controller or a controller shared with a subset of the components in the electrical power distribution system. The controllers in such case communicate with each other as needed in order to perform the functions described herein. In all cases, the controller(s) may be hardwired in communication with the components and/or may be wirelessly in communication with the components. In another embodiment, an external controller 170 communicates with the controller(s). Controller 170 may be a part of a cloud-computing based energy management system and connect to controller 101 via the Internet, for example.

Embodiments of the invention can further be described as an electrical power distribution system 100 that includes an electrical power router. The power router has a number of input ports and a number of output ports, and distributes an electrical signal received on one or more of the input ports to one or more of the output ports. In one embodiment, the electrical power router is a common direct current (DC) bus with a number of bus interfaces. In such an embodiment, an electrical input adapter, e.g., DC power input adapter 150, is coupled to one of the electrical power router's input ports and further to couple to an electrical power source, e.g., PV solar power source 155. The electrical input adapter receives and converts an electrical signal input from the electrical power source to the electrical signal distributed by the power router. The electrical input adapter in such an embodiment includes an interface, e.g., interface 151, with the electrical power source that has electrical and mechanical characteristics that match those of the electrical power source, and an interface, e.g., interface 152, with the electrical power router that has electrical and mechanical characteristics that match those of the electrical power router.

Further in such an embodiment, an electrical output adapter, e.g., DC power output adapter 135, is coupled to one of the output ports and further to couple to an electrical power load, e.g., DC power loads 145. The electrical output adapter receives and converts the electrical signal distributed by the power router from the one of the output ports to an electrical signal output to the electrical power load. The electrical output adapter includes an interface, e.g., interface 137, with the electrical power load that has electrical and mechanical characteristics that match those of the electrical power load, and an interface, e.g., interface 136, with the electrical power router that has electrical and mechanical characteristics that match those of the electrical power router.

The embodiment further includes a controller 101 coupled to the electrical input adapter, the electrical output adapter, and the electrical power router, to control transmission of the electrical signal from the electrical input adapter to the electrical output adapter through the electrical power router. A subset of the bus interfaces have an electrical circuit coupled to the DC bus and to couple to a DC voltage output of an AC to DC converter or DC to DC converter of the electrical input adapter. The subset of the bus interfaces control an amount of current provided in the electrical signal to be distributed by the power router.

In one embodiment of the electrical distribution system, the subset of bus interfaces control the amount of current provided in the electrical signal to be distributed by the power router by performing one or more of the functions of: current direction control, current limit control, current magnitude control, current sensing, voltage sensing and voltage control on an input to the electrical circuit, voltage sensing and voltage control on an output of the electrical circuit.

In this embodiment, a second subset of the bus interfaces includes an electrical circuit coupled to the DC bus and to couple to a DC voltage input of a DC to DC converter or DC to AC converter of the electrical output adapter. The second subset of the bus interfaces control an amount of current received from the electrical signal distributed by the power router.

In one embodiment, the second subject of bus interfaces controls the amount of current received from the electrical signal distributed by the power router by performing one or more of the functions of: current direction control, current limit control, current magnitude control, current sensing, voltage sensing and voltage control on the input to the electrical circuit, voltage sensing and voltage control on the output of the electric circuit.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. An electrical power distribution system, comprising:
a DC bus transmitting electrical power at a first fixed DC voltage level;
a plurality of alternating current (AC) power output ports that transmit electrical power at a first fixed AC voltage level to a corresponding plurality of AC power loads;
a AC power output adapter coupled to the DC bus and to the plurality of AC power output ports, the AC power output adapter comprising a DC-to-AC (DC/AC) converter that receives and converts the electrical power transmitted on the DC bus at the first fixed DC voltage level to the electrical power transmitted at the first fixed AC voltage level by the plurality of AC power output ports;
first circuitry that detects an amount of AC power transmitted by the plurality of AC power output ports to the plurality of AC power loads;
an AC power input/output (I/O) adapter coupled to an AC power grid, and coupled to the DC bus and to the plurality of AC power output ports, the AC power I/O adapter comprising:
an input/output interface that receives electrical power transmitted from the AC power grid at a second fixed AC voltage level;
an AC-to-DC (AC/DC) bidirectional converter, coupled to the input/output interface, that:
receives from the input/output interface the electrical power transmitted from the AC power grid at the second fixed AC voltage level and converts the electrical power transmitted from the AC power grid at the second fixed AC voltage level to the electrical power transmitted at the first fixed DC voltage level on the DC bus;
receives and converts the electrical power transmitted on the DC bus at the first fixed DC voltage level to the electrical power transmitted at the second fixed AC voltage level by the AC power grid; and
receives from the input/output interface the electrical power transmitted from the AC power grid at the second fixed AC voltage level, converts the electrical power transmitted from the AC power grid at the second fixed AC voltage level to the electrical power at the first fixed AC voltage level to transmit to the plurality of AC power output ports via the input/output interface;

a DC power input adapter coupled to the DC bus and coupled to a DC power source, the DC power input adapter comprising a DC-to-DC (DC/DC) converter that receives and converts electrical power transmitted by the DC power source at a second fixed DC voltage level to the electrical power transmitted on the DC bus at first fixed DC voltage level; and a controller coupled to the AC power I/O adapter, the AC power output adapter, and the first circuitry, that controls an amount of the electrical power transmitted:

from the AC power grid at the second fixed AC voltage level that the AC power I/O adapter receives and converts to the electrical power at the first fixed AC voltage level for transmission by the plurality of AC power output ports, based on the amount of AC power transmitted by the plurality of AC power output ports to the plurality of AC power loads as detected by the first circuitry;

on the DC bus at the first fixed DC voltage level that the AC power output adapter receives and converts to the electrical power at the first fixed AC voltage level for transmission by the plurality of AC power output ports, based on the amount of AC power transmitted by the plurality of AC power output ports to the plurality of AC power loads detected by the first circuitry; and wherein the controller is further coupled to the DC power input adapter to control an amount of the electrical power at the second fixed DC voltage level that the DC power input adapter receives and converts to electrical power at the first fixed DC voltage level transmitted on the DC bus based on desirability of or priority assigned to one or more of: unit price, environmental impact, availability, quality, stability, capacity, transmission or delivery efficiency, location or distance of a source of the electrical power transmitted from the AC power grid at the second fixed AC voltage level relative to the desirability of or priority assigned to the electrical power transmitted by the DC power source at the second fixed DC voltage level.

2. The electrical power distribution system of claim 1, further comprising:

a plurality of DC power output ports that transmit electrical power at a third fixed DC voltage level to a corresponding plurality of DC power loads;

a DC power output adapter coupled to the DC bus and to the plurality of DC power output ports, the DC power output adapter comprising a DC-to-DC (DC/DC) converter that receives and converts the electrical power transmitted on the DC bus at the first fixed DC voltage level to electrical power at the third fixed DC voltage level transmitted by the plurality of DC power output ports;

second circuitry that detects an amount of DC power transmitted by the plurality of DC power output ports to the plurality of DC power loads;

wherein the controller further is coupled to the DC power output adapter, and the second circuitry, to control an amount of the electrical power transmitted:

on the DC bus at the first fixed DC voltage level that the DC power output adapter receives and converts to electrical power at the third fixed DC voltage level transmitted by the plurality of DC power output ports, based on the amount of DC power transmitted by the plurality of DC power output ports to the plurality of DC power loads as detected by the second circuitry; and from the AC power grid at the second fixed AC voltage that the AC power I/O adapter receives and converts to the electrical power at the first fixed DC voltage level transmitted on the DC bus, based on one or more of: the amount of AC power transmitted by the plurality of AC power output ports to the plurality of AC power loads as detected by the first circuitry, and the amount of DC power transmitted by the plurality of DC power output ports to the plurality of DC power loads detected by the second circuitry.

3. The electrical power distribution system of claim 2, wherein the controller is further coupled to the DC power input adapter to control an amount of the electrical power transmitted at the second fixed DC voltage level that the DC power input adapter receives and converts to electrical power at the first fixed DC voltage level transmitted on the DC bus further based on one or more of:

the amount of DC power transmitted by the plurality of DC power output ports to the plurality of DC power loads detected by the first circuitry; and the amount of AC power transmitted by the plurality of AC power output ports to the plurality of AC power loads detected by the second circuitry.

4. The electrical power distribution of claim 3, further comprising third circuitry to detect a state of the DC power source; and wherein the controller is further coupled to the DC power input adapter to control an amount of the electrical power at the second fixed DC voltage level that the DC power input adapter receives and converts to electrical power at the first fixed DC voltage level transmitted on the DC bus based on the state of the DC power source.

5. The electrical power distribution of claim 4 further comprising:

a DC power input/output (I/O) adapter coupled to the DC bus and coupled to a DC power storage device, the DC power I/O adapter comprising a bi-directional DC/DC converter that receives and converts the electrical power transmitted on the DC bus at the first fixed DC voltage level to an electrical power transmitted to the DC power storage device at a fourth fixed DC voltage level, and receives and converts the electrical power transmitted from the DC power storage device at the fourth fixed DC voltage level to the electrical power transmitted on the DC bus at the first fixed DC voltage level;

wherein the controller is further coupled to the DC power I/O adapter to control an amount of the electrical power transmitted on the DC bus at the first fixed DC voltage level that the DC power I/O adapter receives and converts to electrical power transmitted at the fourth fixed DC voltage level to the DC power storage device based on:

the amount of DC power transmitted by the plurality of DC power output ports to the plurality of DC loads detected by the first circuitry;

the amount of AC power transmitted by the plurality of AC power output ports to the plurality of AC loads detected by the second circuitry; and the amount of the electrical power transmitted by the DC power source at the third fixed DC voltage level.

6. The electrical power distribution of claim 5, wherein the controller is further to control an amount of the electrical power at the fourth fixed DC voltage level that the DC power I/O adapter receives and converts for transmission on the DC bus at the first fixed DC voltage level, based on one or more of:
  the amount of DC power transmitted by the plurality of DC power output ports to the plurality of DC loads detected by the first circuitry;
  the amount of AC power transmitted by the plurality of AC power output ports to the plurality of AC loads detected by the second circuitry;
  the amount of the electrical power transmitted by the DC power source at the second fixed DC voltage level;
  desirability of or priority assigned to one or more of unit price, environmental impact, availability, quality, stability, capacity, transmission or delivery efficiency, location or distance of a source of the electrical power transmitted from the AC power grid at the second fixed AC voltage level relative to the desirability of or priority assigned to the electrical power transmitted by the DC power I/O adapter at the fourth fixed DC voltage level; and
  desirability of or priority assigned to one or more of unit price, environmental impact, availability, quality, stability, capacity, transmission or delivery efficiency, location or distance of a source of the electrical power transmitted from the DC power source at the second fixed DC voltage level relative to the desirability of or priority assigned to the electrical power transmitted by the DC power I/O adapter at the fourth fixed DC voltage level.

7. The electrical power distribution system of claim 6, wherein the controller is further to control an amount of the electrical power transmitted on the DC bus at the first fixed DC voltage level that the AC power I/O adapter receives and converts to the electrical power at the second fixed AC voltage level transmitted to the AC power grid, based on one or more of: the amount of DC power transmitted by the plurality of DC power output ports to the plurality of DC power loads detected by the first circuitry, and the amount of AC power transmitted by the plurality of AC power output ports to the plurality of AC power loads detected by the second circuitry, the state of the DC power source, a state of the DC power storage device.

* * * * *